(12) United States Patent
Kim et al.

(10) Patent No.: US 11,129,124 B2
(45) Date of Patent: Sep. 21, 2021

(54) ELECTRONIC DEVICE, SERVER DEVICE, AND METHOD FOR DETERMINING LOCATION OF ELECTRONIC DEVICE

(71) Applicant: Samsung Electronics Co., Ltd., Suwon-si (KR)

(72) Inventors: Jinwoo Kim, Suwon-si (KR); Chaeman Lim, Suwon-si (KR); Hyejoong Kang, Suwon-si (KR); Bumsoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 16/449,727

(22) Filed: Jun. 24, 2019

(65) Prior Publication Data

US 2020/0022103 A1 Jan. 16, 2020

(30) Foreign Application Priority Data

Jul. 13, 2018 (KR) .................. 10-2018-0081929

(51) Int. Cl.
*G01S 5/02* (2010.01)
*H04W 64/00* (2009.01)

(52) U.S. Cl.
CPC .................. *H04W 64/00* (2013.01)

(58) Field of Classification Search
CPC . H04W 64/00; H04W 4/02; H04M 2203/558; G01S 5/0226; G01S 5/0009; G01S 5/0242; G01S 5/0295
See application file for complete search history.

(56) References Cited

U.S. PATENT DOCUMENTS 9,402,154 B2 7/2016 Houri
2007/0243869 A1* 10/2007 Kwon ................ G08B 21/0261
455/435.1

(Continued)

FOREIGN PATENT DOCUMENTS

EP 3 799 699 A0 4/2021

OTHER PUBLICATIONS

International Search Report dated Oct. 16, 2019, issued in International No. PCT/KR2019/008503.

(Continued)

*Primary Examiner* — Rafael Pérez-Gutiérrez
*Assistant Examiner* — Xiang Zhang
(74) *Attorney, Agent, or Firm* — Jefferson IP Law, LLP

(57) ABSTRACT

An electronic device is provided. The electronic device includes a first wireless communication circuit supporting near-field communication with APs, a second wireless communication circuit supporting cellular communication with base stations, a processor, and a memory. The processor receives a first identifier of a first AP by using the first wireless communication circuit, generates a first determination by confirming whether or not the list includes the first identifier and location information associated with the first identifier, transmits the first identifier to an external server by using the first wireless communication circuit or the second wireless communication circuit at least partially on the basis of the first determination, receives first information regarding a location associated with the first identifier from the external server through the first wireless communication circuit or the second wireless communication circuit, and determines the location of the electronic device at least on the basis of the first information.

14 Claims, 11 Drawing Sheets

(56) References Cited

U.S. PATENT DOCUMENTS

| | | | | |
|---|---|---|---|---|
| 2010/0240394 A1* | 9/2010 | Yamada | ......... | H04M 1/274516 455/456.1 |
| 2011/0176523 A1* | 7/2011 | Huang | ................. | H04W 64/00 370/338 |
| 2012/0184288 A1* | 7/2012 | Kosolobov | ........... | G01S 5/0263 455/456.1 |
| 2012/0264447 A1* | 10/2012 | Rieger, III | ............ | G01S 5/0252 455/456.1 |
| 2012/0294231 A1* | 11/2012 | Finlow-Bates | ....... | H04W 48/14 370/328 |
| 2012/0322459 A1* | 12/2012 | Jaffri | ......................... | G01S 1/68 455/456.1 |
| 2013/0165142 A1 | 6/2013 | Huang | | |
| 2013/0165150 A1* | 6/2013 | Cho | ....................... | H04L 67/18 455/456.2 |
| 2013/0281122 A1 | 10/2013 | Zelinka | | |
| 2013/0303186 A1* | 11/2013 | Gordon | ................ | H04W 64/00 455/456.1 |
| 2014/0045536 A1 | 2/2014 | Sydir et al. | | |
| 2014/0274116 A1* | 9/2014 | Xu | ......................... | G01S 11/06 455/456.1 |
| 2014/0342754 A1 | 11/2014 | Liu et al. | | |
| 2015/0281934 A1* | 10/2015 | Kawaguchi | .......... | H04W 48/20 370/259 |
| 2015/0350825 A1 | 12/2015 | Kim et al. | | |
| 2016/0192141 A1 | 6/2016 | Park et al. | | |
| 2017/0019762 A1* | 1/2017 | Prechner | ............... | G01S 5/0284 |
| 2017/0127373 A1 | 5/2017 | Deshpande et al. | | |
| 2018/0077671 A1 | 3/2018 | Lee et al. | | |
| 2018/0338245 A1* | 11/2018 | Tam | ..................... | H04W 24/04 |
| 2020/0019580 A1 | 1/2020 | Kim et al. | | |

OTHER PUBLICATIONS

European Search Report dated May 27, 2021, issued in European Application No. 19834839.3.

\* cited by examiner

ELECTRONIC DEVICE, SERVER DEVICE, AND METHOD FOR DETERMINING LOCATION OF ELECTRONIC DEVICE

CROSS-REFERENCE TO RELATED APPLICATION(S)

This application is based on and claims priority under 35 U.S.C. 119 of a Korean patent application number 10-2018-0081929, filed on Jul. 13, 2018, in the Korean Intellectual Property Office, the disclosure of which is incorporated by reference herein in its entirety.

BACKGROUND

1. Field

The disclosure relates to an electronic device and a server device. More particularly, the disclosure relates to an electronic device capable of determining the current location thereof and a server device capable of determining the location of an external electronic device.

2. Description of Related Art

A portable electronic device such as a smartphone or a tablet personal computer (PC) (hereinafter, referred to as an electronic device) has at least one wireless communication function (for example, cellular communication, wireless fidelity (Wi-Fi), and the like) such that the same can transmit/receive data to/from another device, and is capable of providing the user with various user experiences on the basis of such a wireless communication function.

Electronic devices can execute various kinds of applications and, among the same, applications providing location-based services (LBS) such as a map service, a navigation service, and a social network service (SNS) are capable of acquiring location information of the electronic devices and providing users with services on the basis thereof.

The above information is presented as background information only to assist with an understanding of the disclosure. No determination has been made, and no assertion is made, as to whether any of the above might be applicable as prior art with regard to the disclosure.

SUMMARY

Methods for acquiring location information by an electronic device include a scheme of determining the location on the basis of a signal received from a global positioning system (GPS) satellite by using a GPS sensor, a scheme of determining the location by using a wireless communication function such as cellular communication and/or near-field communication, and the like.

In the case of an electronic device of the related art, the accuracy may be limited when determining the location by using the wireless communication function, and an overhead may occur in the process of repeated data communication and storage.

Aspects of the disclosure are to address at least the above-mentioned problems and/or disadvantages and to provide at least the advantages described below. Accordingly, an aspect of the disclosure is to provide an electronic device, a server device, and a method for determining the location of an electronic device, wherein the location of the electronic device can be determined more efficiently and accurately on the basis of data acquired through different kinds of wireless communication functions.

Additional aspects will be set forth in part in the description which follows and, in part, will be apparent from the description, or may be learned by practice of the presented embodiments.

In accordance with an aspect of the disclosure, an electronic device is provided. The electronic device includes a first wireless communication circuit configured to support near-field communication with at least one access point (AP), a second wireless communication circuit configured to support cellular communication with at least one base station, at least one processor operatively connected to the first wireless communication circuit and to the second wireless communication circuit, and a memory operatively connected to the at least one processor and configured to store a list including identifiers and location information of APs. The memory may include instructions that, when executed, cause the at least one processor to receive a first identifier of a first AP by using the first wireless communication circuit, generate a first determination by confirming whether or not the list includes the first identifier and location information associated with the first identifier, transmit the first identifier to an external server by using the first wireless communication circuit or the second wireless communication circuit at least partially on the basis of the first determination, receive first information regarding a location associated with the first identifier from the external server through the first wireless communication circuit or the second wireless communication circuit, and determine the location of the electronic device at least on the basis of the received first information.

In accordance with another aspect of the disclosure, a server device is provided. The server device includes a communication interface configured to support communication with an external electronic device, a memory configured to store a first database including identifiers and location information of APs, and at least one processor operatively connected to the communication interface and to the memory. The memory may include instructions that, when executed, cause the at least one processor to receive an identifier of at least one AP from the external electronic device through the communication interface, acquire at least one piece of first information regarding a location associated with the received identifier of the at least one AP from the first database, determine the location of the external electronic device at least on the basis of the at least one piece of first information, and transmit the determined location of the external electronic device to the external electronic device through the communication interface.

In accordance with another aspect of the disclosure, a method for determining a location of an electronic device is provided. The method includes storing a list including identifiers and location information of APs in a memory, receiving a first identifier of a AP, generating a first determination by confirming whether or not the list includes the first identifier and location information associated with the first identifier, transmitting the first identifier to an external server at least partially on the basis of the first determination, receiving first information regarding a location associated with the first identifier from the external server, and determining the location of the electronic device at least on the basis of the received first information.

According to various embodiments, there may be provided an electronic device, a server device, and a method for determining the location of an electronic device, wherein the location of the electronic device can be determined more efficiently and accurately on the basis of data acquired through different kinds of wireless communication functions.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
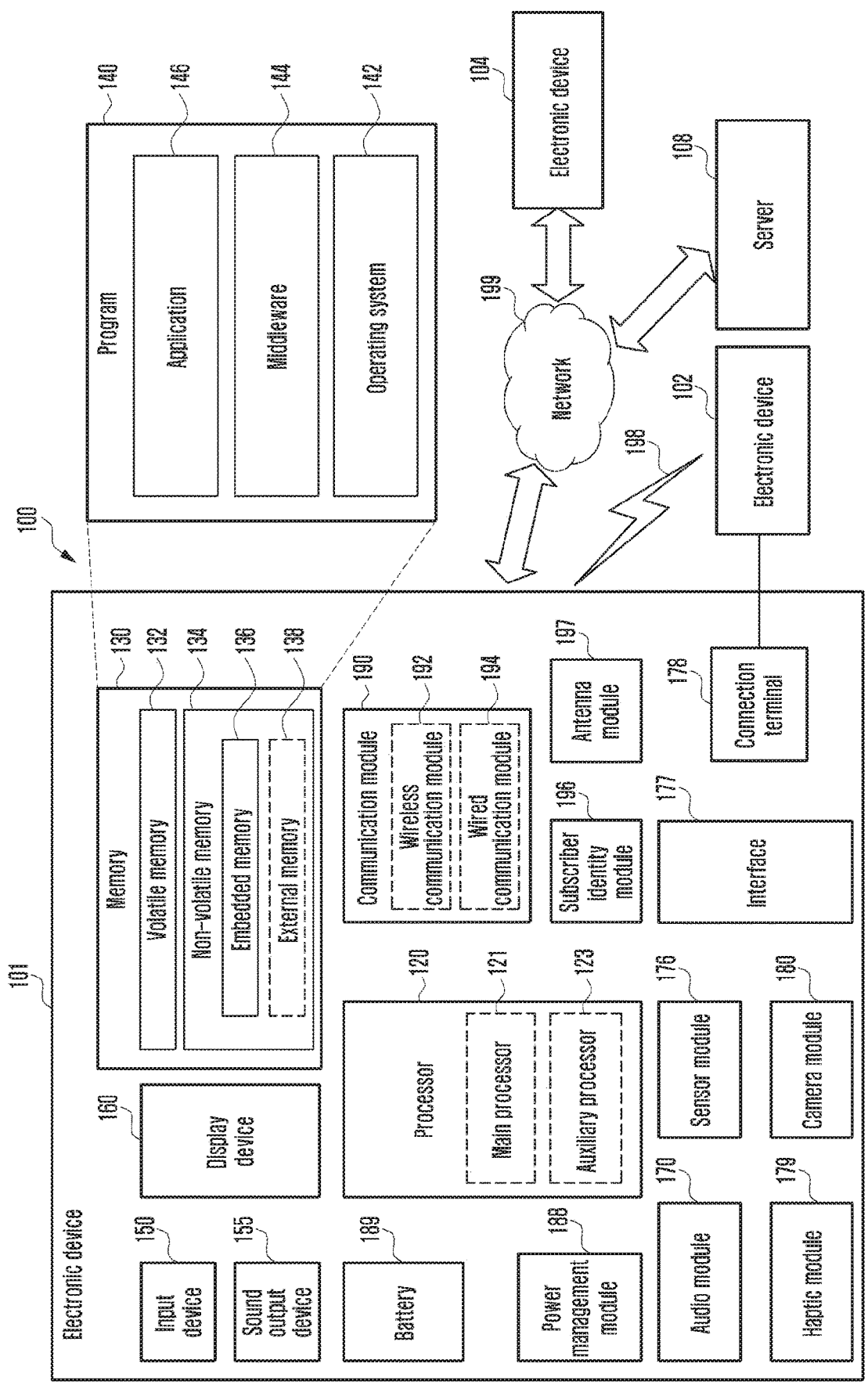
FIG. 1 is a block diagram of an electronic device inside a network environment according to various embodiments of the disclosure.

FIG. 1 is a block diagram illustrating an electronic device in a network environment according to various embodiments of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
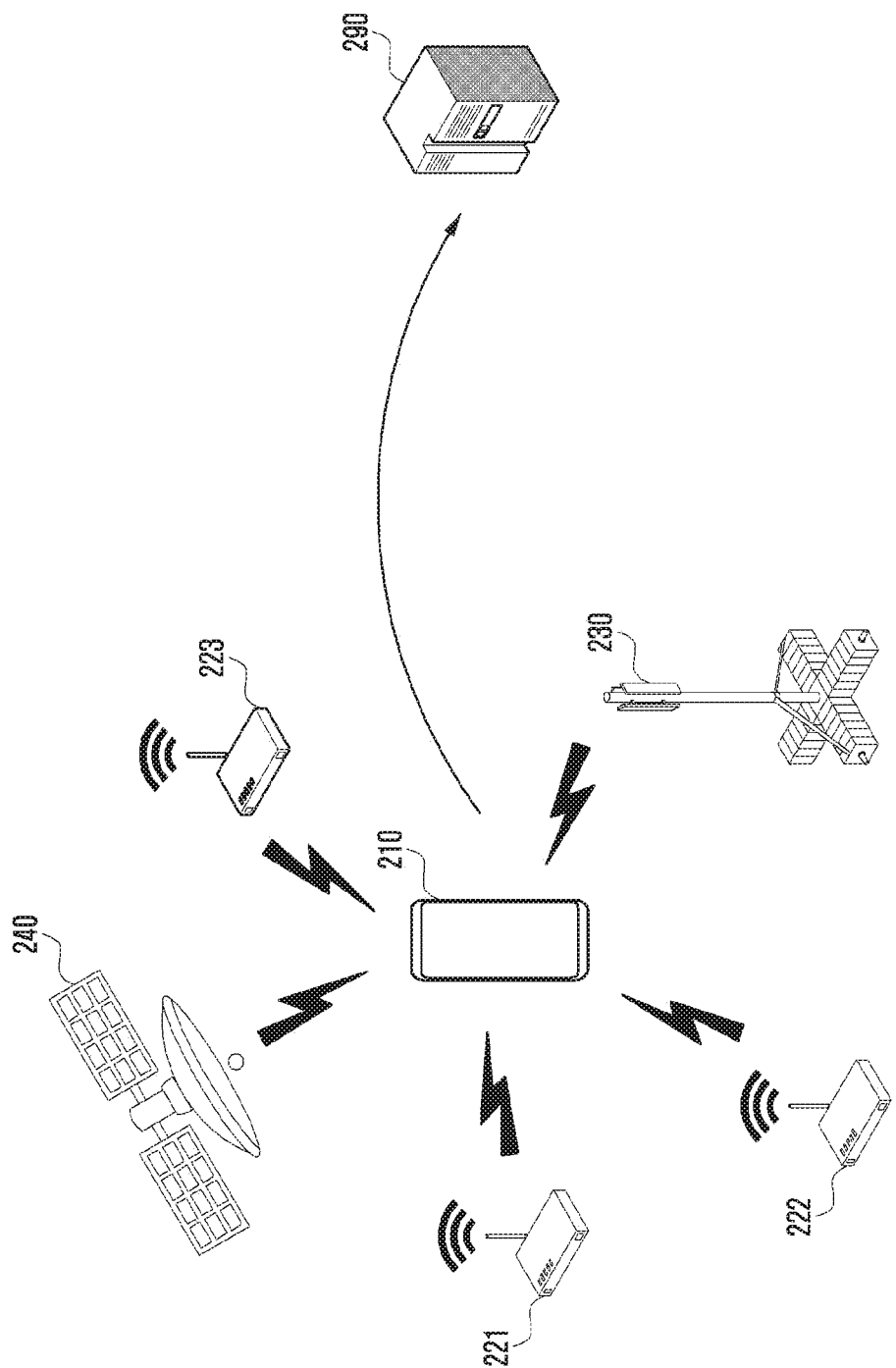
FIG. 2 illustrates various devices for determining a location of an electronic device according to various embodiments of the disclosure.

FIG. 2 illustrates various devices for determining a location of an electronic device according to various embodiments of the disclosure.

According to various embodiments, an electronic device 210 or a server device 290 may determine (or estimate) the location of the electronic device 210 by using location information of at least one base station 230 adjacent to the electronic device 210 or location information of at least one of at least one access point (AP) device 221, 222, and 223.

Referring to FIG. 2, the electronic device 210 may be implemented as a portable electronic device such as a smartphone or a tablet PC, but is not limited thereto. Various kinds of devices having a wireless communication function (for example, cellular communication and/or near-field communication) may correspond to the electronic device 210 according to the disclosure. For example, the electronic device 210 may be a tag device having only a wireless communication function for the purpose of location tracking.

According to various embodiments, the electronic device 210 may communicate with adjacent AP devices 221, 222, and 223 by using near-field communication. The near-field communication may include wireless fidelity (Wi-Fi). The distance at which communication with the AP devices 221, 222, and 223 is possible may be about 10 m to 200 m, and may differ depending on the specification of the AP devices 221, 222, and 223 and the peripheral communication environment.

According to various embodiments, each AP device 221, 222, and 223 may have a unique identifier, and the unique identifier may include a basic service set identifier (BSSID). Each AP device 221, 222, and 223 may periodically broadcast a beacon signal including the identifier thereof, and the electronic device 210 may receive the beacon signal and acquire the identifier of each adjacent AP device 221, 222, and 223.

According to various embodiments, when multiple AP devices 221, 222, and 223 are positioned on the periphery of the electronic device 210, the electronic device 210 may acquire all identifiers of the multiple AP devices 221, 222, and 223. Hereinafter, the identifiers of respective AP devices 221, 222, and 223 may also be referred to as a first AP identifier, a second AP identifier, a third AP identifier, and the like.

According to various embodiments, when the electronic device 210 is to access a network (for example, a public data network) by using one of the AP devices 221, 222, and 223, the electronic device 210 may select one from discovered adjacent AP devices 221, 222, and 223 by using a user input or setting information, may access the network by using the selected AP device 221, 222, or 223, and may transmit/receive data to/from various devices on the network.

According to various embodiments, the electronic device 210 may communicate with the base station 230 in order to perform cellular communication. The cellular communication refers to various kinds of mobile communication schemes subscribed through mobile communication providers, and may use various mobile communication protocols such as long term evolution (LTE), LTE-advanced (LTE-A), code division multiple access (CDMA), wide band CDMA (WCDMA), universal mobile telecommunications service (UNITS), wireless broadband (WiBro), and global system for mobile communications (GSM), but is not limited to the above examples. The electronic device 210 may access the network through one base station 230 and may transmit/receive data to/from various devices on the network.

According to various embodiments, each base station 230 may include an identifier, and the identifier of each base station 230 may include a cell identifier (CID). When accessing a base station 230, the electronic device 210 may acquire the identifier of the accessed base station 230. Hereinafter, the identifiers of respective base stations 230 may also be referred to as a first CID, a second CID, and the like.

According to various embodiments, the electronic device 210 may also acquire location information by using a global positioning system (GPS) (or GNSS). To this end, the electronic device 210 may include a GPS sensor (not illustrated) (or GNSS sensor) capable of receiving signals from a GPS satellite 240, and may determine the location thereof by using a widely known location measuring technique (for example, code tracking, phase tracking, and the like) on the basis of signals received from at least one GPS satellite 240. The GPS sensor may be included, for example, in at least one of a wireless communication module (for example, the wireless communication module 192 in FIG. 1) or a sensor module (for example, the sensor module 176 in FIG. 1).

According to various embodiments, the server device 290 may communicate with multiple electronic devices through the network, may acquire location information from respective electronic devices, and may store the same as a database. For example, the electronic device 210 may transmit the identifier of at least one AP device 221, 222, and 223, the identifier of the base station 230, and/or GPS location information to the server device 290, and the server device 290 may map the identifier (for example, CID) of the base station 230, the identifier (for example, BSSID) of the AP devices 221, 222, and 223, and the location information (for example, latitude and longitude), may store the same in the database, and may update information in the database when corresponding information is received from at least one electronic device.

According to various embodiments, the electronic device 210 or the server device 290 may execute a positioning algorithm which determines (or estimates) the location of the electronic device 210 with reference to the identifier of at least one AP device 221, 222, and 223 and/or the identifier of the base station 230, which are acquired by the electronic device 210. When the positioning algorithm is executed, information in the database of the server device 290 may be used. The positioning algorithm may be executed by the electronic device 210 and/or the server device 290. It will be assumed in the following embodiments (for example, FIG. 3 to FIG. 7) that the electronic device 210 determines the location thereof by using the positioning algorithm, and repeated descriptions will be partially omitted when describing embodiments (for example, FIG. 8 and FIG. 9) in which the base station 230 determines the location of the electronic device 210 by using the positioning algorithm.

Figure 3:
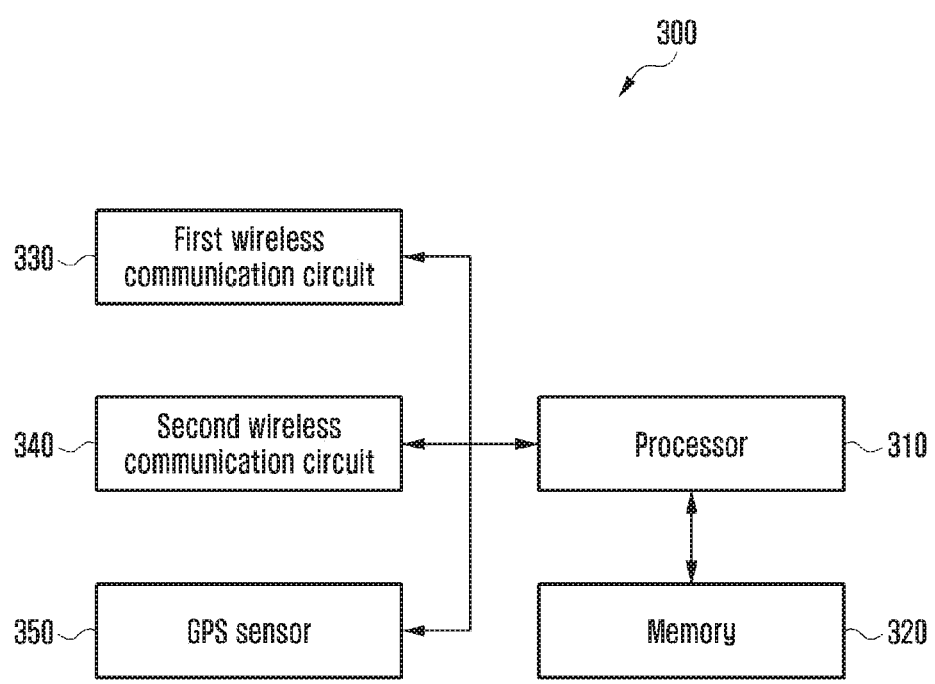
FIG. 3 is a block diagram of an electronic device according to various embodiments of the disclosure.

FIG. 3 is a block diagram of an electronic device according to various embodiments of the disclosure.

Referring to FIG. 3, an electronic device 300 according to various embodiments may include a processor 310, a memory 320, a first wireless communication circuit 330, a second wireless communication circuit 340, and a GPS sensor 350, and, even if at least some of the illustrated constituent elements are omitted or replaced, there would be no difficulty in implementing various embodiments. The electronic device 300 may further include at least some of the constituent elements and/or functions of the electronic device 101 in FIG. 1.

According to various embodiments, the first wireless communication circuit 330 may support near-field communication with at least one AP device (for example, the AP devices 221, 222, and 223 in FIG. 2). The near-field communication supported by the first wireless communication circuit 330 may be Wi-Fi, but is not limited thereto. The first wireless communication circuit 330 may include an antenna for transmitting/receiving data to/from the AP device through the near-field communication, and at least one control circuit.

According to various embodiments, the AP device may be the AP device 221, 222, or 223 in FIG. 2. The AP device may be connected to the network through an Ethernet cable, and may provide data, which is transmitted from the first wireless communication circuit 330, to another device (for example, the server device 290 in FIG. 2) through the network. The AP device may have a unique identifier, and the unique identifier may include a BSSID, but may also include another identifier, such as a MAC address, of the AP device. The AP device may periodically broadcast a beacon signal including the identifier thereof, and the electronic device 300 may receive the beacon signal by using the first wireless communication circuit 330 and may acquire the identifier of each adjacent AP device.

According to various embodiments, the second wireless communication circuit 340 may support cellular communication with at least one base station (for example, the base station 230 in FIG. 2). The cellular communication supported by the second wireless communication circuit 340 is not limited, and may include, for example, at least one selected from various mobile communication protocols including LTE, LTE-A, CDMA, WCDMA, UMTS, WiBro, and GSM. The second wireless communication circuit 340 may include at least one processor (for example, a CP).

According to various embodiments, the electronic device 300 may access the network through one base station and may transmit/receive data to/from various devices on the network. Each base station may include an identifier, and the identifier of each base station may include a CID. When accessing a base station, the electronic device 300 may acquire the identifier of the accessed base station.

According to various embodiments, the GPS sensor 350 may receive signals from a GPS satellite (for example, the GPS satellite 240 in FIG. 2) and may determine the location of the electronic device 300 therefrom by using a widely known location measuring technique. The GPS sensor 350 is not an indispensable constituent element of the electronic device 300 according to various embodiments, and may be omitted.

According to various embodiments, the processor 310 is a constituent element capable of performing calculation or data processing related to control and/or communication of respective constituent elements of the electronic device 300, and may include at least some of the constituent elements of the processor 120 in FIG. 1. The processor 310 may be connected to internal constituent elements of the electronic device 300, such as the first wireless communication circuit 330, the second wireless communication circuit 340, and the memory 320, operatively, electrically, and/or functionally.

According to various embodiments, the memory 320 is configured to store nonlimited pieces of digital data temporarily or permanently, and may include at least some of the constituent elements of the memory 130 in FIG. 1. The memory may include a volatile memory and a nonvolatile memory. The nonvolatile memory may include at least one of a one-time programmable ROM (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash), a hard drive, or a solid state drive (SSD). The volatile memory may include at least one of a dynamic RAM (DRAM), a static RAM (SRAM), or a synchronous dynamic RAM (SDRAM).

According to various embodiments, the memory 320 may store various instructions that can be performed by the processor 310. The instructions may include control commands of arithmetic and logical operations, data movements, input/output, and the like, which can be recognized by the processor 310. In addition, the memory 320 may store at least a part of the program 140 in FIG. 1.

According to various embodiments, the memory 320 may store a list including identifiers and location information of APs. The list stored in the memory 320 may include identifiers of APs acquired from an external server device and location information matching thereto, and may be updated as the corresponding information is received. In addition, the memory 320 may also store a list including identifiers and location information of base stations.

According to various embodiments, the location information of APs and/or the location information of base stations may be defined as coordinate information including latitudes and longitudes, but are not limited thereto, and various parameters (for example, a point of interest (POI) or address) capable of defining the location of APs and/or base stations may be used.

According to various embodiments, the location information of APs and/or the location information of base stations, which are stored on the list in the memory 320, may not be defined as indicating a specific point only, but defined as a coverage including a specific point (for example, specific latitude and longitude). In this case, acquired pieces of location information may be classified according to the level, and, the higher the level, the larger coverage the same may have. The level (or the size of the coverage) may be determined according to the method of acquiring the identifier of each AP device and/or each base station.

According to various embodiments, operation and data processing functions that the processor 310 can implement inside the electronic device 300 may not be limited, but various embodiments for determining the location of the electronic device 300 on the basis of data (for example, an AP identifier and a CID) acquired from the first wireless communication circuit 330 and the second wireless communication circuit 340 will be described herein.

According to various embodiments, the processor 310 may confirm a location information request event. The location information request event may be generated by an application, and the application may be an application that provides a location-based service (LBS) such as a map, a navigation, or a social network service (SNS). Alternatively, the processor 310 may periodically perform an operation for confirming the location information of the electronic device 300 without any separate event.

According to various embodiments, the electronic device 300 may use a GPS signal from the GPS sensor 350, near-field communication through the first wireless communication circuit 330, and/or cellular communication through the second wireless communication circuit 340, in order to confirm the location information thereof, and the degree of accuracy may be in the descending order of the GPS, the near-field communication, and the cellular communication. In contrast, the processor 310 may initially confirm the location information of the electronic device 300 by using the GPS sensor 350 when a location information request event occurs (or periodically). When the electronic device 300 has no GPS sensor 350, when the GPS sensor 350 is turned off, and/or when the electronic device 300 is positioned indoors and is unable to receive signals from GPS satellites, the location of the electronic device 300 may be acquired by using a positioning algorithm (described later) that utilizes near-field communication and/or cellular communication.

According to various embodiments, when a location information request event is confirmed, the processor 310 may scan an AP device positioned adjacent thereto by using the first wireless communication circuit 330, thereby confirming the identifier (for example, the first AP identifier) of at least one AP (for example, the first AP device).

According to various embodiments, the processor 310 may confirm whether or not the first AP identifier of the first AP device and location information matching with the first AP identifier are stored on the list in the memory 320. When multiple AP devices are discovered, the processor 310 may confirm whether or not the identifiers (for example, the second AP identifier) of the discovered multiple AP devices (for example, the second AP device) are also stored on the list in the memory 320. The processor 310 may generate a first determination (for example, whether or not the first AP identifier and the location information exist on the list) according to the result of confirmation.

According to various embodiments, when it is confirmed at least partially on the basis of the first determination that the first AP identifier of the first AP device and the location information matching with the first AP identifier are stored on the list in the memory 320, the location of the electronic device 300 may be determined on the basis of the location information matching with the stored first AP identifier. When the identifiers and location information of multiple discovered AP devices are stored on the list in the memory 320, the processor 310 may determine the location of the electronic device 300 on the basis of multiple pieces of location information. For example, the location of the electronic device 300 may be determined on the basis of the average value of the multiple pieces of location information (for example, latitudes and longitudes). In another embodiment, the processor 310 may confirm coverages including locations associated with identifiers of respective AP devices and/or base stations, and may determine the location of the electronic device 300 on the basis of an area in which respective coverages overlap.

According to various embodiments, when it is confirmed at least partially on the basis of the first determination that the first AP identifier of the first AP device and the location information matching with the first AP identifier are not stored on the list in the memory 320, the processor 310 may transmit the first AP identifier to the server device by using the first wireless communication circuit 330 or the second wireless communication circuit 340. When identifiers (for example, the second AP identifier and the third AP identifier) of multiple APs are acquired, the processor 310 may transmit the acquired identifiers of the multiple AP devices to the server device.

According to various embodiments, the server device may search for location information associated with the first identifier acquired from the electronic device 300 in the database, and may transmit the discovered location information to the electronic device 300. The electronic device 300 may receive the location information associated with the first identifier from the server device by using the first wireless communication circuit 330 or the second wireless communication circuit 340.

According to various embodiments, the server device may be connected to multiple electronic devices 300 through the network and may store, in the database, location information acquired from respective electronic devices 300 by the GPS sensor 350, identifiers of discovered AP devices, and/or identifiers of base stations. In this case, a first database may be stored and updated by matching identifiers and location information of AP devices, and a second database may be stored and updated by matching identifiers and location information of base stations.

Exemplary identifiers and location information of AP devices stored in the first database are given in Table 1 below:

TABLE 1

| Mac Address | SSID | Longitude(°) | Latitude(°) |
|---|---|---|---|
| 00:00:00:00:00:01 | Kim | 37.485280 | 126.879428 |
| 00:00:00:00:00:02 | Lee | 37.485123 | 126.879444 |
| 00:00:00:00:00:03 | Park | 37.485353 | 126.879529 |
| 00:00:00:00:00:04 | Choi | 27.485557 | 126.879680 |

Exemplary identifiers and location information of base stations stored in the second database are given in Table 2 below:

TABLE 2

| MCC | MNC | Cell ID | Longitude (°) | Latitude (°) |
|---|---|---|---|---|
| 450 | 5 | 1000000 | 37.485280 | 126.879428 |
| 450 | 5 | 1000001 | 37.481057 | 126.881381 |
| 450 | 5 | 1000002 | 37.477907 | 126.887990 |
| ... | ... | | | |
| 234 | 10 | 1000000 | 37.258243 | 127.047478 |
| 460 | 0 | 1000000 | 37.242260 | 127.089975 |

According to various embodiments, location information stored in a database may be defined as a coverage including a specific point (for example, latitude and longitude). For example, the location of the first AP device may be defined, with reference to latitude 37.485280° and longitude 126.879428°, as a quadrangular coverage having a latitude range of 37.485270° to 37.485290° and a longitude range of 126.879418° to 126.879438°. Alternatively, the location of the first AP device may be defined as a circular coverage having a radius of 10 m with the center positioned at latitude 37.485280° and longitude 126.879428°.

According to various embodiments, the processor 310 may further acquire the identifier of a base station besides the identifiers of discovered AP devices described above, may confirm location information corresponding thereto, and may determine the location of the electronic device 300 by using location information matching with the identifiers of the AP devices and location information matching with the identifier of the base station.

According to various embodiments, the processor 310 may receive the identifier (for example, CID) of the first base station accessed by the electronic device 300 by using the second wireless communication circuit 340. The identifier may include a CID.

According to various embodiments, the processor 310 may confirm whether or not the CID of the base station and location information matching with the CID are stored on the list in the memory 320. When it is confirmed that location information corresponding to the identifier of the discovered AP device and the identifier of the base station is not stored on the list, the processor 310 may transmit the identifier of the discovered AP device and the identifier of the base station to the server device by using the first wireless communication circuit 330 or the second wireless communication circuit 340, and may receive location information associated with the identifier of the AP device and location information associated with the identifier of the base station from the server device.

According to various embodiments, on the basis of the identifier of at least one AP device and/or the identifier of a base station, which are acquired by the electronic device 300, a positioning algorithm for determining the location of the electronic device 300 may be performed by the electronic device 300 (for example, the processor 310) or by the server device.

According to various embodiments, when the positioning algorithm is performed by the electronic device 300, the processor 310 may determine the location of the electronic device 300 on the basis of a location associated with the identifier of at least one AP device acquired from the server device.

In another embodiment, when the positioning algorithm is performed by the server device, the server device may confirm location information matching with the identifier of at least one AP device received from the electronic device 300, may determine the location of the electronic device 300 on the basis of the location information, and may transmit the same to the electronic device 300.

According to various embodiments, the electronic device 300 may update the list stored in the memory 320 on the basis of the determined location of the electronic device 300. For example, when the electronic device 300 has confirmed the identifier of the first AP device, that of the second AP device, and that of the first base station, and when the electronic device 300 and/or the server device has determined the location of the electronic device 300 by using the same, location information in the memory 320 matching with the identifier of the first AP device, that of the second AP device, and that of the first base station may be updated to the determined location information. The updated list information may be used when the electronic device 300 later confirms the location of the electronic device 300.

According to various embodiments, the processor 310 may provide the determined location information of the electronic device 300 to the applications (for example, a map, a navigation, and an SNS) that have requested the location information, and the applications may provide the user with various services on the basis of the location information.

Figure 4:
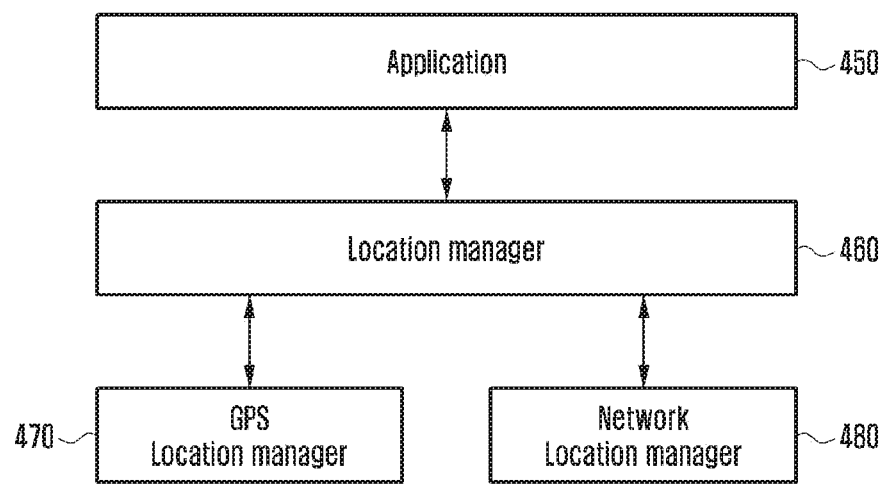
FIG. 4 is a block diagram of software for determining a location of an electronic device according to various embodiments of the disclosure.

FIG. 4 is a block diagram of software for determining a location of an electronic device according to various embodiments of the disclosure.

The software blocks illustrated in FIG. 4 may be formed differently according to the platform structure of the OS installed in the electronic device.

Referring to FIG. 4, the electronic device may include an application 450, a location manager 460, a GPS location manager 470, and a network location manager 480. For example, the location manager 460, the GPS location manager 470, and the network location manager 480 may be included in the middleware (for example, the middleware 144 in FIG. 1) of a program (for example, the program 140 in FIG. 1) or in the OS (for example, the OS 142 in FIG. 1).

According to various embodiments, the electronic device may store and execute various applications 450, and it will be assumed, for example, that the application 450 illustrated in FIG. 4 is a location-based application such as a map, a navigation, or an SNS. The application 450 may request the location manager 460 to provide the location information of the electronic device.

According to various embodiments, the location manager 460 may control, at an upper level, multiple types in which location information of the electronic device can be acquired, may select and/or synthesize location information acquired in multiple types, thereby acquiring location information of the electronic device, and may provide the same to the application 450 that has requested the same.

According to various embodiments, the GPS location manager 470 may confirm the location of the electronic device on the basis of signals received from a GPS sensor.

According to various embodiments, the network location manager 480 may confirm location information corresponding to the identifier (for example, the first AP identifier) of an AP device, which has been acquired from the first wireless communication circuit, from the list stored in the memory, or may confirm the same from data received from the server device. In addition, the network location manager 480 may confirm location information corresponding to the identifier (for example, the CID) of a base station, which has been acquired from the second wireless communication circuit, from the list stored in the memory, or may confirm the same from data received from the server device.

According to various embodiments, the location manager 460 may determine the location of the electronic device by using a positioning algorithm on the basis of location information acquired from the GPS location manager 470 and from the network location manager 480.

Figure 5:
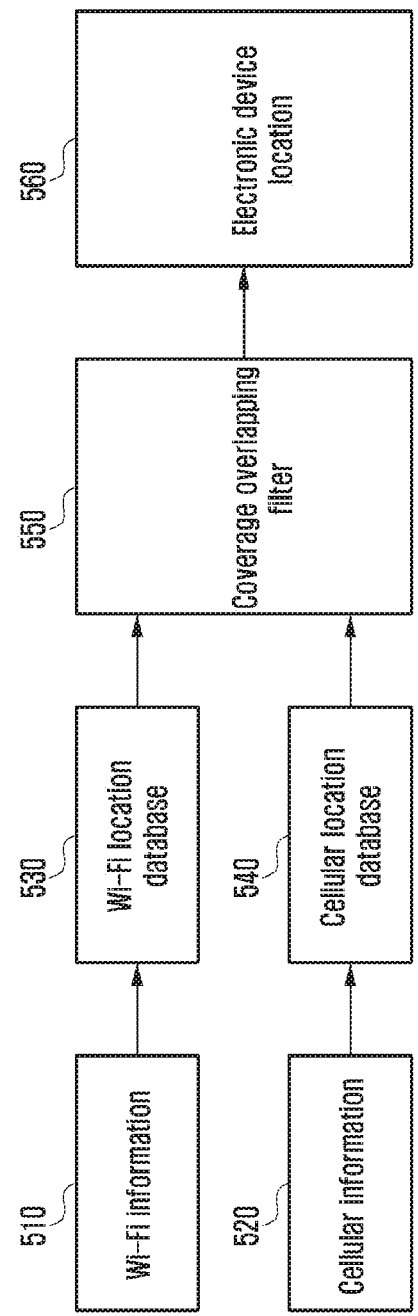
FIG. 5 illustrates an algorithm for determining a location of an electronic device according to various embodiments of the disclosure.

FIG. 5 illustrates an algorithm for determining a location of an electronic device according to various embodiments of the disclosure.

Referring to FIG. 5, the electronic device (for example, the processor 310 in FIG. 3) may acquire the identifier 510 of AP devices (for example, the first AP device 221 and the second AP device 222 in FIG. 2) positioned adjacent thereto, and the identifier 520 of a base station.

According to various embodiments, the electronic device may confirm location information corresponding to the acquired identifiers of AP devices from a Wi-Fi location database 530, and may confirm location information corresponding to the acquired identifier of the base station from a cellular location database 540. According to various embodiments, the location information acquired from the databases 530 and 540 may be coordinate information of a specific point defined in terms of latitude and longitude, or a coverage having a predetermined size.

According to various embodiments, the electronic device and/or the server device (for example, the server device 290 in FIG. 2) may confirm an overlapping area of at least one piece of acquired location information by using a coverage overlapping filter 550. For example, location information corresponding to the first AP identifier, the second AP identifier, and the first CID may be acquired from the databases 530 and 540 of the server device; and a first coverage corresponding to the first AP identifier, a second coverage corresponding to the second AP identifier, and a third coverage corresponding to the first CID may be confirmed therefrom. When location information corresponding to each identifier is defined only as coordinate information of a specific point, not as a coverage, in the Wi-Fi location database 530 and in the cellular location database 540, the coverage overlapping filter 550 may set an area, the center of which is described by the corresponding coordinate, as a virtual coverage.

According to various embodiments, the coverage overlapping filter 550 may set an area in which the first coverage, the second coverage, and the third coverage overlap as an effective area, and may exclude the location of an AP device and/or a base station, which deviates from the effective area, or the coverage of which does not overlap the effective area, during location determination. Alternatively, the location of an AP device and/or a base station, the distance of which from the effective area is equal to or larger than a predetermined value, during location determination.

According to various embodiments, the electronic device may determine the location 560 of the electronic device on the basis of the overlapping coverage area. For example, the latitude and longitude value of the center point of the effective area may be determined as the location of the electronic device.

Figure 6:
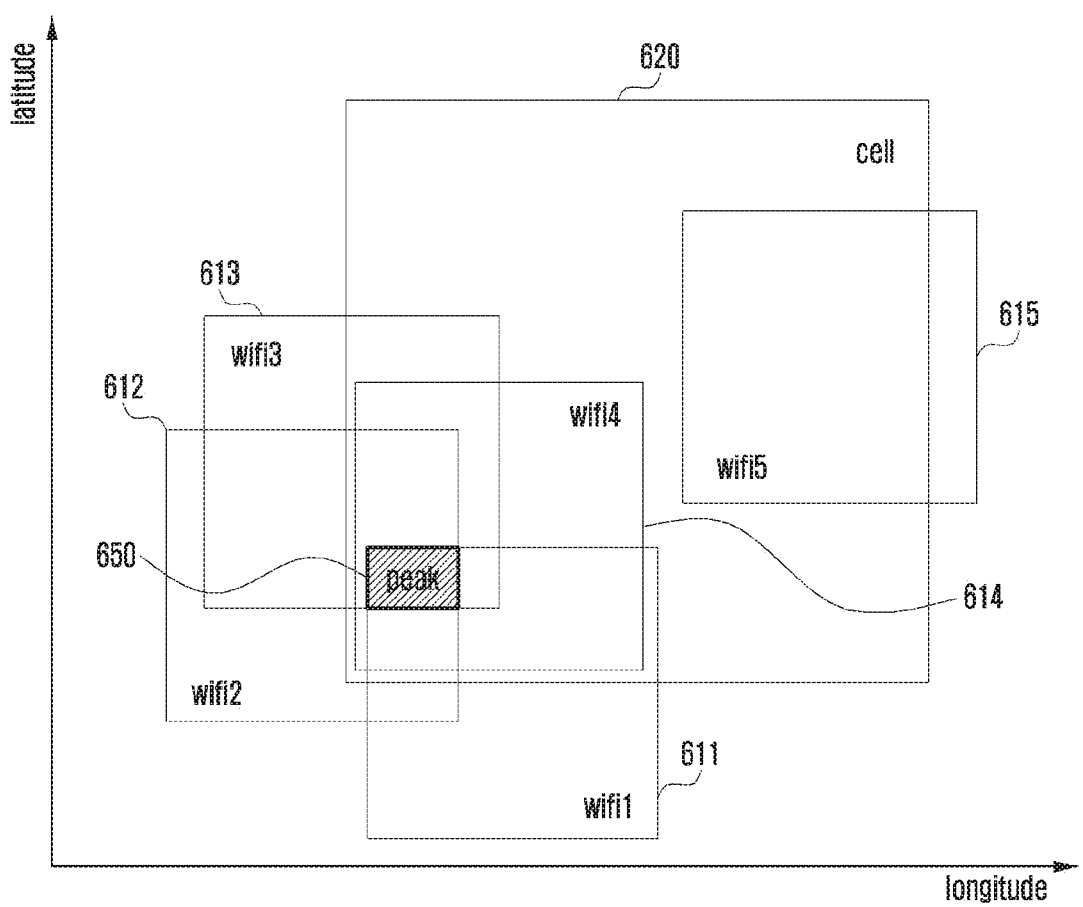
FIG. 6 illustrates a method for determining a location of an electronic device by using coverages of access point (AP) devices and cells according to various embodiments of the disclosure.

FIG. 6 illustrates a method for determining a location of an electronic device by using coverages of AP devices and cells according to various embodiments of the disclosure.

Referring to FIG. 6, an example in which an electronic device acquires identifiers of five AP devices 611, 612, 613, 614, and 615 and one base station 620 and then determines the location of the electronic device therefrom is illustrated.

A peak area 650 refers to an area in which coverages of the base station 620, the first AP device 611, the second AP device 612, the third AP device 613, and the fourth AP device 614 overlap, and may be determined as an effective area. In this example, the coverage of the fifth AP device 615 does not overlap the effective area, and may be excluded when determining the location.

According to various embodiments, the electronic device or the server device may determine an area (for example, the center) of an area (for example, the peak area 650 in FIG. 6) in which respective coverages overlap as the location of the electronic device.

According to other embodiments, without going through the process of confirming the area in which respective coverages overlap, the electronic device or the server device may determine the average value of location information (for example, latitude and longitude coordinates) of respective AP devices and/or base stations as the location of the electronic device. In this embodiment, the electronic device or the server device may assign a weight to a specific piece of location information during calculation.

Figure 7:
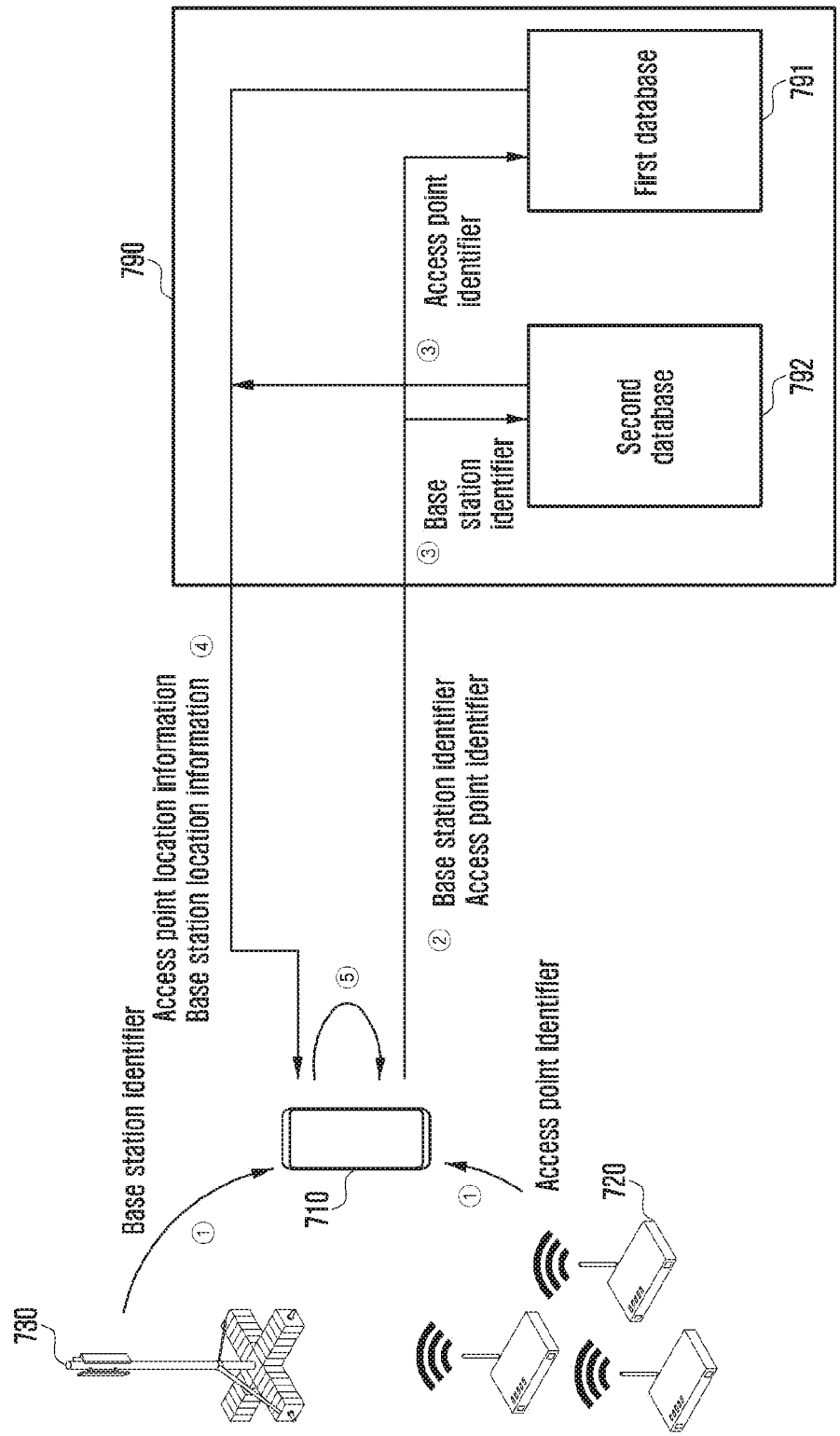
FIG. 7 illustrates an embodiment in which an electronic device determines a location thereof according to various embodiments of the disclosure.

FIG. 7 illustrates an embodiment in which an electronic device determines a location thereof according to various embodiments of the disclosure.

Referring to FIG. 7, when a location information request event generated by an application is confirmed, an electronic device 710 (for example, the processor 310 in FIG. 3) according to various embodiments may scan an AP device 720 positioned adjacent thereto by using the first wireless communication circuit (for example, the first wireless communication circuit 330 in FIG. 3), thereby confirming the identifier (for example, BSSID) of at least one AP device 720. In addition, the electronic device 710 may confirm the identifier (for example, CID) of a base station 730 by using the second wireless communication circuit (for example, the second wireless communication circuit 340 in FIG. 3).

According to various embodiments, the electronic device 710 may transmit a list including the identifier (for example, CID) of at least one AP and the identifier (for example, BSSID) of the base station 730, which have been acquired through the network by using the first wireless communication circuit and/or the second wireless communication circuit, to the server device 790.

According to various embodiments, the server device 790 may receive the list of the identifier of at least one AP and the identifier of the base station 730, and may confirm location information matching with the identifier of at least one AP received from a pre-constructed first database 791 (for example, Wi-Fi DB). In addition, the server device 790 may confirm location information matching with the identifier of the base station 730 received from a second database 792 (or cell DB).

According to various embodiments, the server device 790 may transmit location information (or Wi-Fi location list) associated with the identifier of at least one AP and location information (or cell location) associated with the identifier of the base station 730 to the electronic device 710.

According to various embodiments, the electronic device 710 may determine the location of the electronic device 710 by using a positioning algorithm on the basis of pieces of location information acquired from the server device 790.

The electronic device 710 may provide the determined location of the electronic device 710 to an application, and the application may provide the user with various services on the basis of the location information.

An electronic device 300 according to various embodiments may include: a first wireless communication circuit 330 configured to support near-field communication with at least one AP; a second wireless communication circuit 340 configured to support cellular communication with at least one base station; a processor 310 operatively connected to the first wireless communication circuit 330 and to the second wireless communication circuit 340; and a memory 320 operatively connected to the processor 310 and configured to store a list including identifiers and location information of APs. The memory 320 may include instructions that, when executed, cause the processor 310: to receive a first identifier of a first AP by using the first wireless communication circuit 330; to generate a first determination by confirming whether or not the list includes the first identifier and location information associated with the first identifier; to transmit the first identifier to an external server by using the first wireless communication circuit 330 or the second wireless communication circuit 340 at least partially on the basis of the first determination; to receive first information regarding a location associated with the first identifier from the external server through the first wireless communication circuit 330 or the second wireless communication circuit 340; and to determine the location of the electronic device 300 at least on the basis of the received first information.

According to various embodiments, the first identifier may include a BSSID of the first AP.

According to various embodiments, the near-field communication may include Wi-Fi communication.

According to various embodiments, the instructions may include instructions that cause the processor 310: to receive a second identifier of a second AP by using the first wireless communication circuit 330; to transmit the second identifier to the external server by using the first wireless communication circuit 330 or the second wireless communication circuit 340; to receive second information regarding a location associated with the second identifier from the external server through the first wireless communication circuit 330 or the second wireless communication circuit 340; and to determine the location of the electronic device 300 at least on the basis of the received first information and second information.

According to various embodiments, the instructions may include instructions that cause the processor 310 to determine the location of the electronic device 300 on the basis of an average value of the location associated with the first identifier contained in the first information and the location associated with the second identifier contained in the second information.

According to various embodiments, the first information may include a first coverage including a location associated with the first identifier; the second information may include a second coverage including a location associated with the second identifier; and the instructions may include instructions that cause the processor 310 to determine at least a part of an area in which the first coverage and the second coverage overlap as the location of the electronic device 300.

According to various embodiments, the instructions may include instructions that cause the processor 310 to update location information associated with the first identifier on the list on the basis of the received first information.

According to various embodiments, the list stored in the memory 320 may further include identifiers and location information of base stations, and the instructions may include instructions that cause the processor 310: to receive a third identifier of a first base station by using the second wireless communication circuit 340; to generate a third determination by confirming whether or not the list includes the third identifier and location information associated with the third identifier; to transmit the third identifier to the external server by using the first wireless communication circuit 330 or the second wireless communication circuit 340 at least partially on the basis of the third determination; to receive third information regarding a location associated with the third identifier from the external server through the first wireless communication circuit 330 or the second wireless communication circuit 340; and to determine the location of the electronic device 300 at least on the basis of the received first information and third information.

According to various embodiments, the third identifier may include a CID of the first base station.

According to various embodiments, the electronic device 300 may further include a GPS sensor, and the instructions may be configured such that, when location information of the electronic device 300 cannot be acquired by using the GPS sensor 350, the first identifier is transmitted to the external server.

Figure 8:
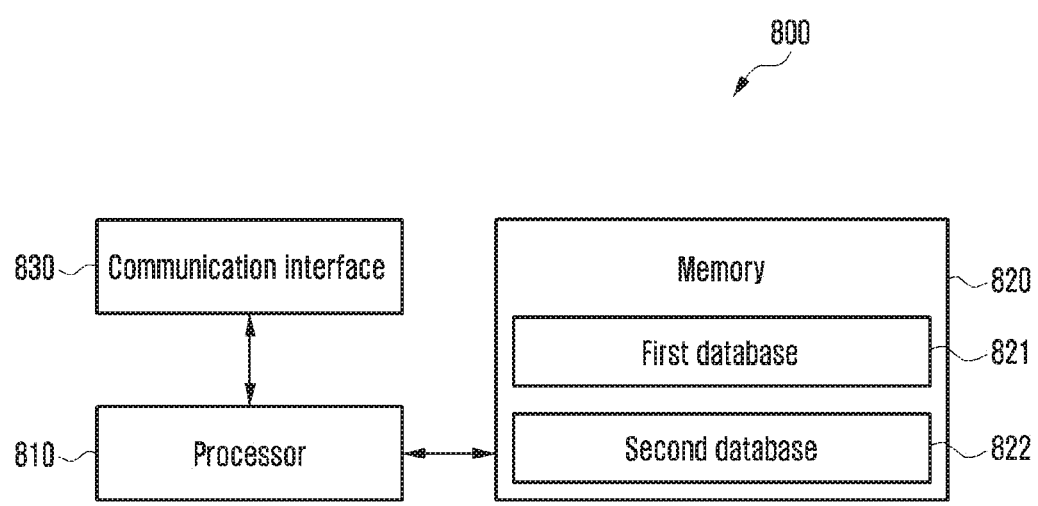
FIG. 8 is a block diagram of a server device according to various embodiments of the disclosure.

FIG. 8 is a block diagram of a server device according to various embodiments of the disclosure.

Referring to FIG. 8, the server device 800 according to various embodiments may include a processor 810, a memory 820, and a communication interface 830 and, even if at least some of the illustrated constituent elements are omitted or replaced, there would be no difficulty in implementing various embodiments.

According to various embodiments, the communication interface 830 may support communication with external electronic devices (for example, the electronic device 210 in FIG. 2). The communication interface 830 may receive data (for example, an AP identifier or a CID) from an electronic device through the network and may transmit data (for example, the determined location of the electronic device) to the electronic device.

According to various embodiments, the memory 820 may include a first database 821 and a second database 822. In the first database 821, identifiers and location information of AP devices may be matched and stored on the basis of data (for example, identifiers of AP devices, identifiers of base stations, and GPS data) acquired from various electronic devices (for example, Table 1). In the second database 822, identifiers and location information of base stations may be matched and stored on the basis of data (for example, identifiers of AP devices, identifiers of base stations, and GPS data) acquired from various electronic devices (for example, Table 2).

According to various embodiments, the processor 810 may confirm, from the first database 821, location information associated with the identifier of an AP device received through the communication interface 830. In addition, the processor 810 may confirm, from the second database 822, location information associated with the identifier of a base station received through the communication interface 830.

According to various embodiments, the processor 810 may determine the location of the electronic device by using a positioning algorithm on the basis of pieces of confirmed location information. The server device 800 may estimate the location of the electronic device by using a positioning algorithm in the same method as in the case of the embodiment described above with reference to FIG. 5 and FIG. 6.

According to various embodiments, the processor 810 may transmit the determined location of an external electronic device to the external electronic device through the communication interface 830. The processor 810 may transmit, to the external device, location information associated with the identifier of an AP device acquired from the first database 821 and location information associated with the identifier of a base station acquired from the second database 822.

According to various embodiments, the processor 810 may update location information matching with the identifier of the AP device in the first database 821 and/or location information matching with the identifier of the base station in the second database 822 on the basis of the acquired location information of the electronic device.

Figure 9:
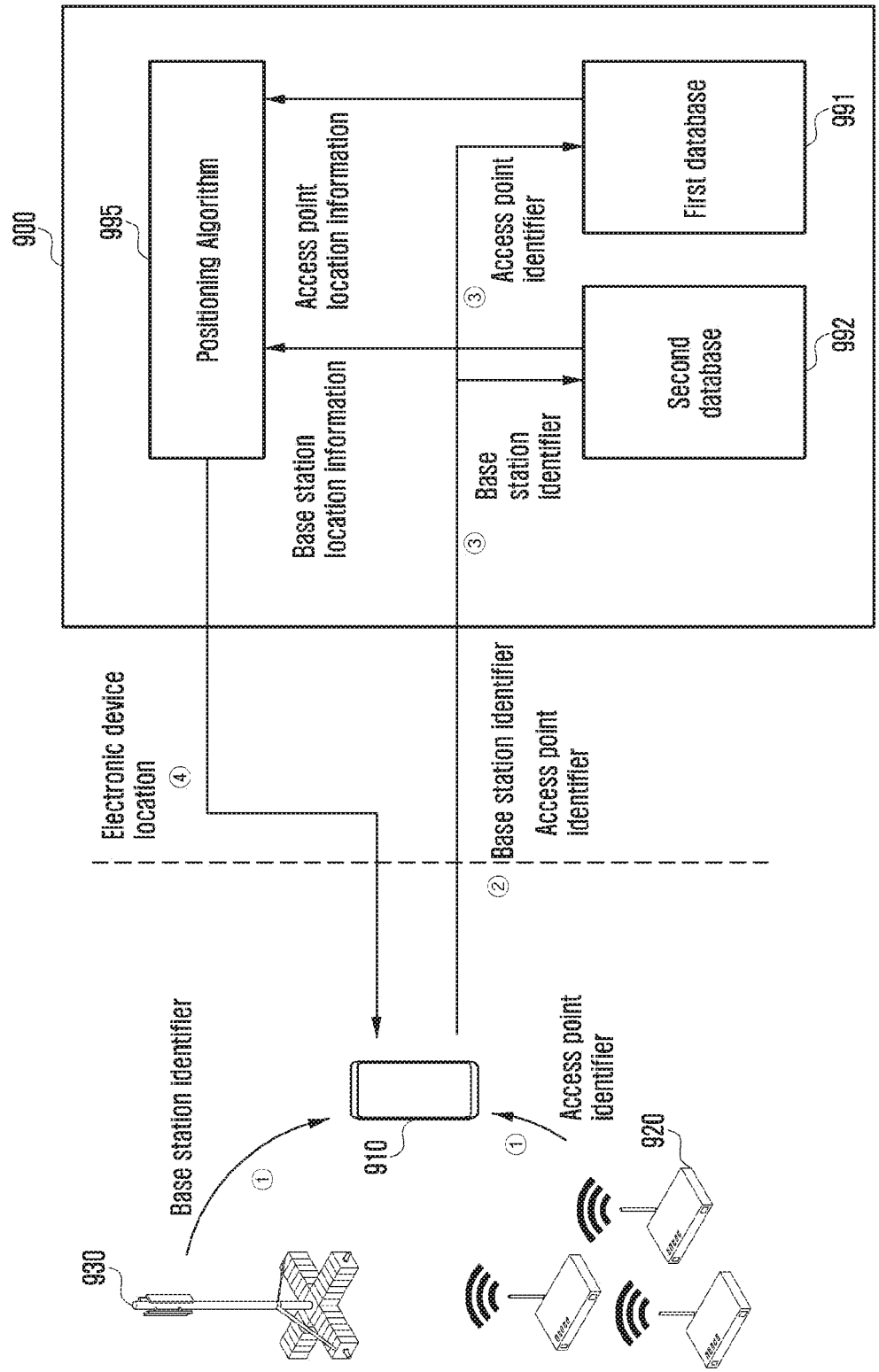
FIG. 9 illustrates an embodiment in which a server device determines a location of an electronic device according to various embodiments of the disclosure.

FIG. 9 illustrates an embodiment in which a server device determines a location of an electronic device according to various embodiments of the disclosure.

Referring to FIG. 9, when a location information request event generated by an application is confirmed, an electronic device 910 (for example, the processor 310 in FIG. 3) according to various embodiments may scan an AP device 920 positioned adjacent thereto by using the first wireless communication circuit (for example, the first wireless communication circuit 330 in FIG. 3), thereby confirming the identifier (for example, BSSID) of at least one AP device 920. In addition, the electronic device 910 may confirm the identifier (for example, CID) of a base station 930 by using the second wireless communication circuit (for example, the second wireless communication circuit 340 in FIG. 3).

According to various embodiments, the electronic device 910 may transmit the identifier of at least one AP and the identifier of the base station 930, which have been acquired through the network by using the first wireless communication circuit and/or the second wireless communication circuit, to a server device 900.

According to various embodiments, the server device 900 may receive the list of the identifier of at least one AP and the identifier of the base station 930, and may confirm location information (or Wi-Fi location) matching with the identifier of at least one AP received from a pre-constructed first database 991 (for example, Wi-Fi DB). In addition, the server device 900 may confirm location information (or cell location) matching with the identifier of the base station 930 received from a second database 992 (or cell DB).

According to various embodiments, the server device 900 may determine the location of the electronic device 910 by using a positioning algorithm 995 on the basis of pieces of location information acquired from the first database 991 and the second database 992. The positioning algorithm 995 may be included in various instructions stored in the memory (for example, the memory 820 in FIG. 8) of the server device, and may be performed by the processor (for example, the processor 810 in FIG. 8).

According to various embodiments, the server device 900 may transmit the determined location of the electronic device 910 (or device location) to the electronic device 910.

A server device 800 according to various embodiments may include: a communication interface 830 configured to support communication with an external electronic device; a memory 820 configured to store a first database 821 including identifiers and location information of APs; and a processor 810 operatively connected to the communication interface 830 and to the memory 820. The memory 820 may include instructions that, when executed, cause the processor 810: to receive an identifier of at least one AP from the external electronic device through the communication interface 830; to acquire at least one piece of first information regarding a location associated with the received identifier of the at least one AP from the first database 821; to determine the location of the external electronic device at least on the basis of the at least one piece of first information; and to transmit the determined location of the external electronic device to the external electronic device through the communication interface 830.

According to various embodiments, the memory 820 may be configured to further store a second database 822 including identifiers and location information of base stations, and the instructions may include instructions that cause the processor 810 to: receive an identifier of a base station from the external electronic device through the communication interface 830; to acquire second information regarding a location associated with the received identifier of the base station from the second database 822; and to determine the location of the external electronic device at least on the basis of the at least one piece of first information and the second information.

According to various embodiments, the instructions may include instructions that cause the processor 810 to transmit the at least one piece of first information and the second information to the external electronic device through the communication interface 830.

According to various embodiments, each of the at least one first identifier may include a first coverage including a location associated with the identifier of the AP, and the instructions may include instructions that cause the processor 810 to determine at least a part of an area in which the at least one first coverage overlaps as the location of the external electronic device.

Figure 10:
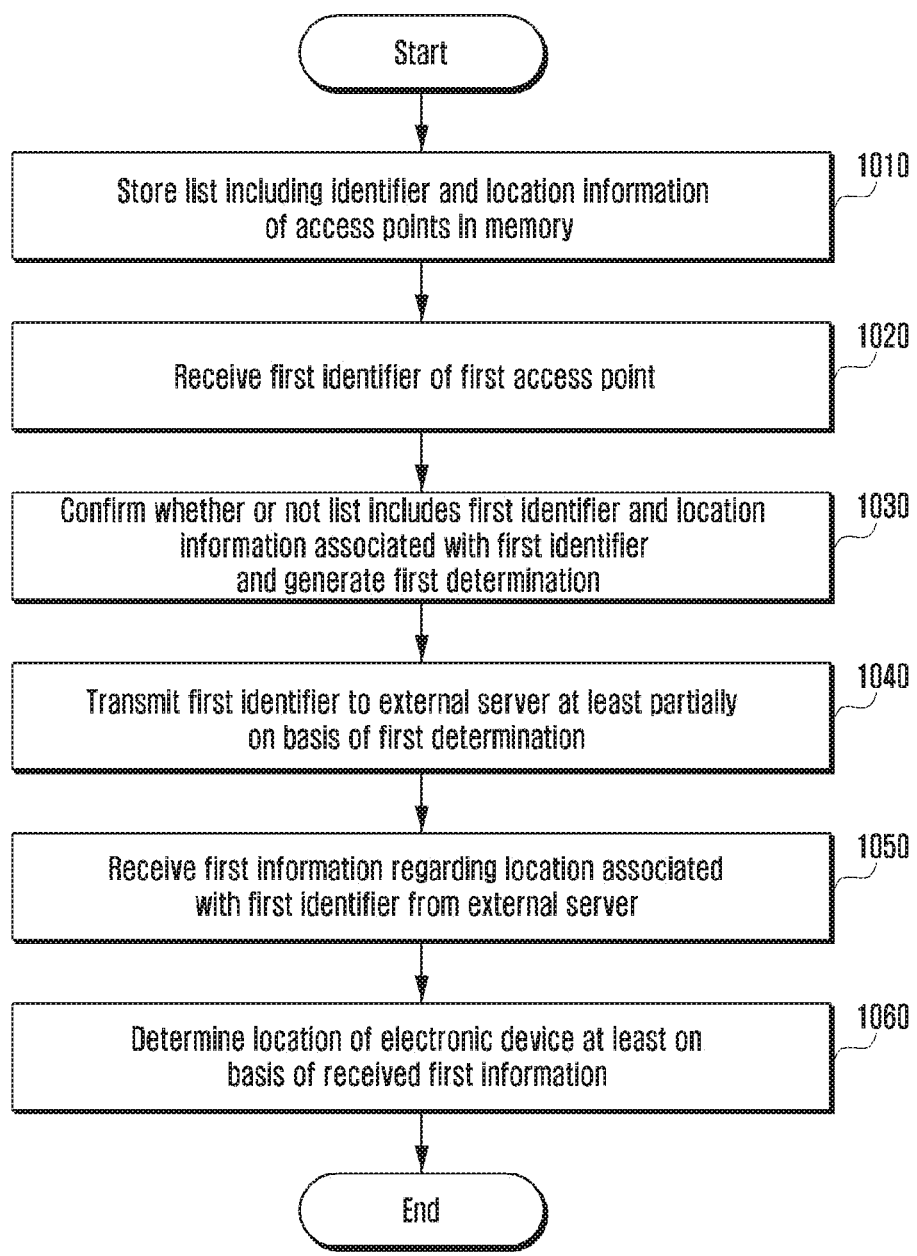
FIG. 10 is a flowchart of a method for determining a location of an electronic device according to various embodiments of the disclosure.

FIG. 10 is a flowchart of a method for determining a location of an electronic device according to various embodiments of the disclosure.

Referring to FIG. 10, the illustrated method may be performed by the electronic device in FIG. 1 to FIG. 9 (for example, the electronic device 300 in FIG. 3), and repeated descriptions of technical features described above will be omitted herein.

According to various embodiments, in operation 1010, the electronic device may store a list including identifiers and location information of in the memory (for example, the memory 320 in FIG. 3). According to various embodiments, the electronic device may further store a list including identifiers and location information of base stations in the memory.

According to various embodiments, in operation 1020, the electronic device (for example, the processor 310 in FIG. 3) may receive the first identifier of the first AP device. According to various embodiments, when a location information request event is confirmed, the processor may scan an AP device positioned adjacent thereto by using the first wireless communication circuit (for example, the first wireless communication circuit 330 in FIG. 3), thereby confirming the identifier of at least one AP device. The identifier of an AP device may include the BSSID thereof.

According to various embodiments, in operation 1030, the electronic device may confirm whether or not the list in the memory includes the first identifier and location information associated with the first identifier, and may accordingly generate a first determination (for example, whether or not the first AP identifier and location information exist on the list).

According to various embodiments, in operation 1040, the electronic device may transmit the first identifier to an external server device (for example, the server device 290 in FIG. 2) at least partially on the basis of the first determination. For example, when the first identifier of the first AP device and the location information matching with the first identifier are not stored on the list in the memory, the electronic device may transmit the first identifier to the external server device by using the first wireless communication circuit or the second wireless communication circuit. When identifiers of multiple AP devices are acquired, the process may transmit the acquired identifiers of multiple AP devices to the external server device.

According to various embodiments, in operation 1050, the electronic device may receive first information regarding a location associated with the first identifier from the server device. According to various embodiments, the server device may search for location information associated with the first identifier acquired from the electronic device in the database, and may transmit the discovered location information to the electronic device. The electronic device may receive the location information associated with the first identifier from the external server by using the first wireless communication circuit or the second wireless communication circuit.

According to various embodiments, in operation 1060, the electronic device may determine the location of the electronic device at least on the basis of the received first information. According to various embodiments, the electronic device may determine the location of the electronic device by using a positioning algorithm on the basis of the pieces of location information acquired from the server device. For example, the electronic device may determine the location of the electronic device on the basis of the average value of multiple pieces of location information (for example, latitudes and longitudes). In another embodiment, the electronic device may confirm coverages including locations associated with identifiers of respective AP devices and/or base stations, and may determine the location of the electronic device on the basis of an area in which respective coverages overlap.

Figure 11:
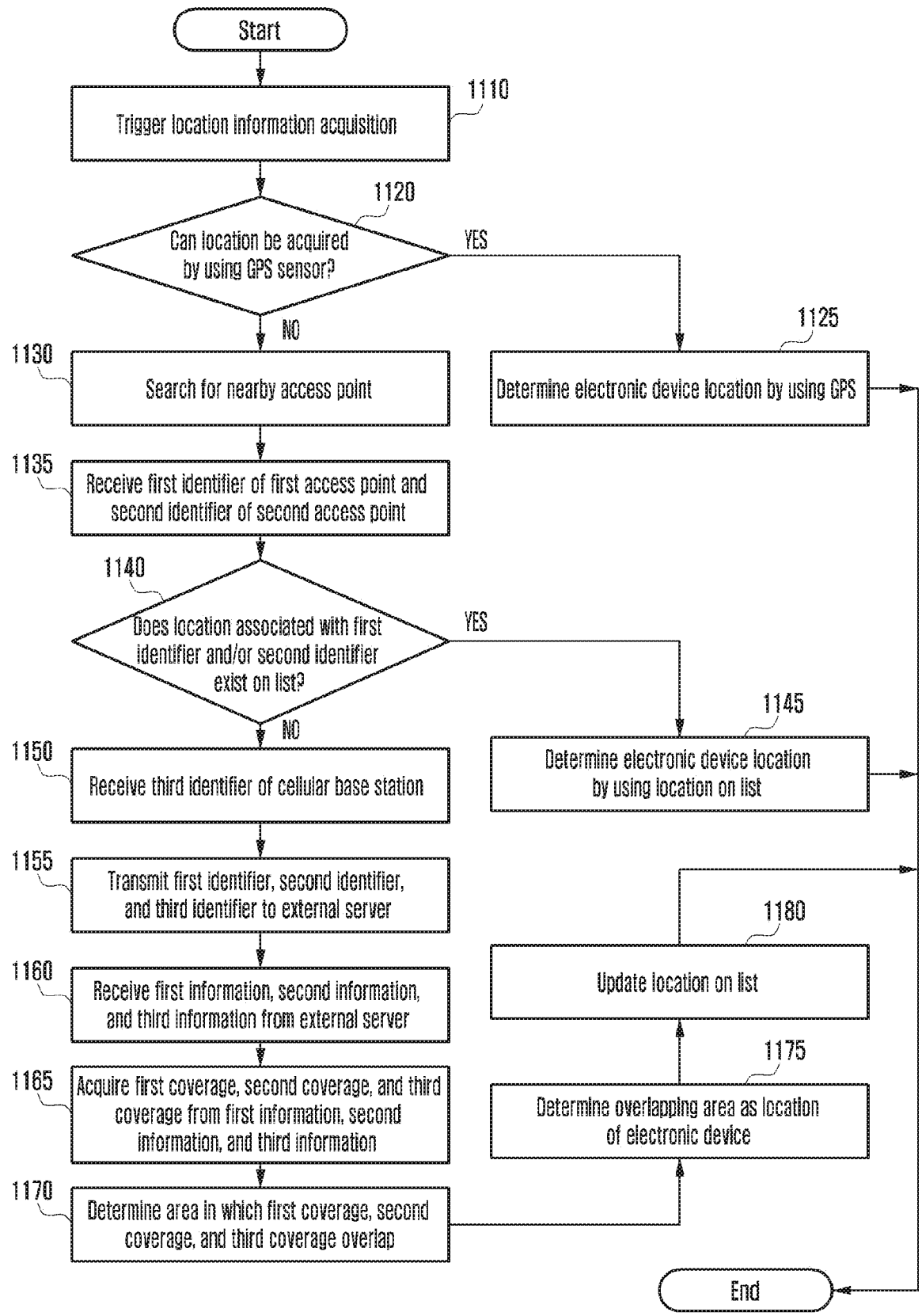
FIG. 11 is a flowchart of a method for determining a location of an electronic device according to various embodiments of the disclosure.

FIG. 11 is a flowchart of a method for determining a location of an electronic device according to various embodiments of the disclosure.

Referring to FIG. 11, the illustrated method may be performed by the electronic device in FIG. 1 to FIG. 9 (for example, the electronic device 300 in FIG. 3), and repeated descriptions of technical features described above will be omitted herein.

According to various embodiments, in operation 1110, the electronic device (for example, the processor 310 in FIG. 3) may confirm a location information request event.

According to various embodiments, in operation 1120, the electronic device may confirm whether or not the location of the electronic device can be acquired by using a GPS sensor (for example, the GPS sensor 350 in FIG. 3).

According to various embodiments, when the location can be acquired by using the GPS sensor, the electronic device may receive a GPS satellite signal and may determine the location of the electronic device therefrom by using a widely known location measuring technique in operation 1125.

When the location cannot be acquired by using the GPS sensor, the, in operation 1130, the electronic device may scan at least one AP device positioned on the periphery thereof.

According to various embodiments, in operation 1135, the electronic device may acquire the first identifier of the first AP device from the first AP device and may acquire the second identifier of the second AP device from the second AP device. According to various embodiments, the electronic device may also acquire identifiers of at least three AP devices positioned within the coverage of near-field communication (for example, Wi-Fi). The first identifier and the second identifier may include the BSSID of the AP devices.

According to various embodiments, in operation 1140, the electronic device may confirm whether or not locations associated with the first identifier (or the first AP identifier) and the second identifier (or the second AP identifier) exist on the list stored in the memory.

According to various embodiments, when locations associated with the first identifier and the second identifier exist on the list stored in the memory, the electronic device may determine the location of the electronic device on the basis of the pieces of location information stored on the list in operation 1145. For example, the location of the electronic device may be determined on the basis of the average value of multiple pieces of location information (for example, latitudes and longitudes). In another embodiment, the processor may confirm coverages including locations associated with identifiers of respective AP devices and/or base stations, and may determine the location of the electronic device on the basis of an area in which respective coverages overlap.

According to various embodiments, in operation 1150, the electronic device may receive the third identifier (or CID) of the base station. The third identifier may include a CID.

According to various embodiments, in operation 1155, the electronic device may transmit the first identifier, the second identifier, and the third identifier, which have been acquired, to the external server device through the network. For example, the electronic device may communicate with the server device through the network by using the first wireless communication circuit (for example, the first wireless communication circuit in FIG. 3) and/or the second wireless communication circuit (for example, the second wireless communication circuit in FIG. 3).

According to various embodiments, in operation 1160, the electronic device may receive first information, second information, and third information from the server device. The first information may include location information associated with the first identifier of the first AP device, the second information may include location information associated with the second identifier of the second AP device, and the third information may include location information associated with the third identifier of the base station.

According to various embodiments, in operation 1165, the electronic device may acquire a first coverage corresponding to the first information, a second coverage corresponding to the second information, and a third coverage corresponding to the third information. According to various embodiments, when first information, second information, and third information acquired from an external device include only the coordinate of a specific point, the electronic device may set an area, the center of which is expressed by the corresponding coordinate, as a virtual coverage. According to other embodiments, the server device may define, in the database, pieces of location information matching with respective AP devices and base stations as coverages having predetermined sizes; and, in this case, the electronic device may receive, from the server device, information regarding the first coverage, the second coverage, and the third coverage as first information, second information, and third information, respectively.

According to various embodiments, in operation 1170, the electronic device may determine an area in which the first coverage, the second coverage, and the third coverage overlap (for example, the peak in FIG. 5).

According to various embodiments, in operation 1175, the electronic device may determine an area of the overlapping area as the location of the electronic device. The electronic device may provide the determined location of the electronic device to an application.

According to various embodiments, in operation 1180, the electronic device may update the list in the memory according to the acquired location of the electronic device.

A method for determining a location of an electronic device according to various embodiments may include: an operation 1010 of storing a list including identifiers and location information of APs in a memory; an operation 1020 of receiving a first identifier of a first AP; an operation 1030 of generating a first determination by confirming whether or not the list includes the first identifier and location information associated with the first identifier; an operation 1040 of transmitting the first identifier to an external server at least partially on the basis of the first determination; an operation 1050 of receiving first information regarding a location associated with the first identifier from the external server; and an operation 1060 of determining the location of the electronic device at least on the basis of the received first information.

According to various embodiments, the method may further include: an operation of receiving a second identifier of a second AP; an operation of transmitting the second identifier to the external server; an operation of receiving second information regarding a location associated with the second identifier from the external serve. The operation of determining the location of the electronic device may include an operation of determining the location of the electronic device on the basis of the received first information and second information.

According to various embodiments, the operation of determining the location of the electronic device may include an operation of determining the location of the electronic device on the basis of an average value of the location associated with the first identifier contained in the first information and the location associated with the second identifier contained in the second information.

According to various embodiments, the first information may include a first coverage including a location associated with the first identifier, the second information may include a second coverage including a location associated with the second identifier, and the operation of determining the location of the electronic device may include an operation of determining at least a part of an area in which the first coverage and the second coverage overlap as the location of the electronic device.

According to various embodiments, the method may further include an operation of updating location information associated with the first identifier on the list on the basis of the received first information.

According to various embodiments, the method may further include: an operation of receiving a third identifier of a first base station; an operation of generating a third determination by confirming whether or not the list includes the third identifier and location information associated with the third identifier; an operation of transmitting the third identifier to the external server at least partially on the basis of the third determination; and an operation of receiving third information regarding a location associated with the third identifier from the external server. The operation of determining the location of the electronic device may include an operation of determining the location of the electronic device on the basis of the received first information and third information.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first wireless communication circuit configured to support near-field communication with at least one access point (AP);
   a second wireless communication circuit configured to support cellular communication with at least one base station;
   at least one processor operatively connected to the first wireless communication circuit and to the second wireless communication circuit; and
   a memory operatively connected to the at least one processor and configured to store a list comprising an identifier of at least one AP and at least one location information corresponding to the identifier of the at least one AP,
   wherein the memory comprises instructions that, when executed, cause the at least one processor to:
      receive a first identifier of a first AP by using the first wireless communication circuit,
      determine whether or not the list comprises the first identifier and location information associated with the first identifier,
      when the list comprises the first identifier and location information associated with the first identifier:
         determine a current location of the electronic device based on the list,
      when the list does not comprise the first identifier and the location information associated with the first identifier:
         transmit the first identifier to an external server by using the first wireless communication circuit or the second wireless communication circuit,
         receive first information regarding a location associated with the first identifier from the external server through the first wireless communication circuit or the second wireless communication circuit,
         determine the current location of the electronic device based on the received first information, and
         update the list based on the received first information.

2. The electronic device of claim 1, wherein the first identifier comprises a basic service set identifier (BSSID) of the first AP.

3. The electronic device of claim 1, wherein the near-field communication comprises Wi-Fi communication.

4. The electronic device of claim 1, wherein the instructions further cause the at least one processor to:
   receive a second identifier of a second AP by using the first wireless communication circuit,
   transmit the second identifier to the external server by using the first wireless communication circuit or the second wireless communication circuit,
   receive second information regarding a location associated with the second identifier from the external server through the first wireless communication circuit or the second wireless communication circuit, and
   determine the current location of the electronic device based on the received first information and second information.

5. The electronic device of claim 4, wherein the instructions further cause the at least one processor to determine the location of the electronic device based on an average value of the location associated with the first identifier contained in the first information and the location associated with the second identifier contained in the second information.

6. The electronic device of claim 4,
   wherein the first information comprises a first coverage comprising a location associated with the first identifier,
   wherein the second information comprises a second coverage comprising a location associated with the second identifier, and
   wherein the instructions further cause the at least one processor to determine at least a part of an area in which the first coverage and the second coverage overlap as the current location of the electronic device.

7. The electronic device of claim 1,
   wherein the list stored in the memory further comprises an identifier of at least one base station and at least one location information corresponding to the identifier of the at least one base station, and
   wherein the instructions further cause the at least one processor to:
      receive a third identifier of a first base station by using the second wireless communication circuit,
      determine whether or not the list comprises the third identifier and location information associated with the third identifier,
      when the list does not comprise the third identifier and location information associated with the third identifier:

transmit the third identifier to the external server by using the first wireless communication circuit or the second wireless communication circuit, receive third information regarding a location associated with the third identifier from the external server through the first wireless communication circuit or the second wireless communication circuit, and determine the current location of the electronic device based on the received first information and third information.

8. The electronic device of claim 7, wherein the third identifier comprises a cell identifier (CID) of the first base station.

9. The electronic device of claim 1,
wherein the electronic device further comprises a global positioning system (GPS) sensor, and
wherein the instructions further cause the at least one processor to, when location information of the electronic device cannot be acquired by using the GPS sensor, transmit the first identifier to the external server.

10. A method, performed by an electronic device, for determining a location of the electronic device, the electronic device comprising a first wireless communication circuit configured to support near-field communication with at least one access point (AP) and a second wireless communication circuit configured to support cellular communication with at least one base station, the method comprising:

storing a list comprising an identifier of the at least one AP and at least one location information corresponding to the identifier of the at least one AP in a memory of the electronic device;

receiving a first identifier of a first AP from the first AP;

determining whether the list stored in the memory of the electronic device comprises the first identifier and location information associated with the first identifier;

when the list comprises the first identifier and location information associated with the first identifier:
determining a current location of the electronic device based on the location information associated with the first identifier of the list;

when the list does not comprise the first identifier and the location information associated with the first identifier:
transmitting the first identifier to an external server;

receiving first information regarding a location associated with the first identifier from the external server;

determining the current location of the electronic device based on the received first information; and updating the list stored in the memory of the electronic device based on the received first information.

11. The method of claim 10, further comprising:
receiving a second identifier of a second AP;
transmitting the second identifier to the external server; and
receiving second information regarding a location associated with the second identifier from the external server,
wherein the determining of the current location of the electronic device comprises determining the current location of the electronic device based on the received first information and second information.

12. The method of claim 11, wherein the determining of the current location of the electronic device comprises determining the current location of the electronic device based on an average value of the location associated with the first identifier contained in the first information and the location associated with the second identifier contained in the second information.

13. The method of claim 11,
wherein the first information comprises a first coverage comprising a location associated with the first identifier,
wherein the second information comprises a second coverage comprising a location associated with the second identifier, and
wherein the determining of the current location of the electronic device comprises determining at least a part of an area in which the first coverage and the second coverage overlap as the current location of the electronic device.

14. The method of claim 10, further comprising:
receiving a third identifier of the at least one base station;
determining whether or not the list comprises the third identifier and location information associated with the third identifier;
when the list does not comprise the third identifier and location information associated with the third identifier:
transmitting the third identifier to the external server; and
receiving third information regarding a location associated with the third identifier from the external server,
wherein the determining the current location of the electronic device comprises determining the current location of the electronic device based on the received first information and third information.

* * * * *